(12) United States Patent  (10) Patent No.: US 7,810,479 B2
Naquin  (45) Date of Patent: Oct. 12, 2010

(54) PISTONS

(75) Inventor: Randolph Naquin, Des Allemands, LA (US)

(73) Assignee: Randolph J. Naquin, Jr., Des Allemands, LA (US)

( * ) Notice: Subject to any disclaimer, the term of this patent is extended or adjusted under 35 U.S.C. 154(b) by 0 days.

(21) Appl. No.: 12/246,502

(22) Filed: Oct. 7, 2008

(65) Prior Publication Data

US 2009/0038594 A1    Feb. 12, 2009

Related U.S. Application Data

(63) Continuation of application No. 11/463,405, filed on Aug. 9, 2006, now abandoned.

(60) Provisional application No. 60/709,942, filed on Aug. 18, 2005.

(51) Int. Cl.
*F02B 3/00* (2006.01)

(52) U.S. Cl. .................... 123/661; 123/193.6

(58) Field of Classification Search .............. 123/193.6, 123/661, 659, 657
See application file for complete search history.

(56) References Cited

U.S. PATENT DOCUMENTS

| 3,797,466 | A | * | 3/1974 | Nambu ........................ 123/256 |
| 3,924,580 | A | | 12/1975 | Taira et al. |
| 3,965,872 | A | * | 6/1976 | Taira et al. ................... 123/269 |
| 4,009,702 | A | * | 3/1977 | Mayer ....................... 123/193.6 |
| 4,063,537 | A | | 12/1977 | Lampredi |
| 4,166,436 | A | | 9/1979 | Yamakawa |
| 4,389,986 | A | * | 6/1983 | Tanasawa .................... 123/298 |
| 4,471,734 | A | * | 9/1984 | Showalter ................. 123/193.6 |
| 5,065,715 | A | * | 11/1991 | Evans ........................ 123/263 |
| 5,103,784 | A | | 4/1992 | Evans |
| 6,237,579 | B1 | | 5/2001 | Singh |
| 2005/0284429 | A1 | * | 12/2005 | Ward ........................ 123/48 B |

* cited by examiner

*Primary Examiner*—M. McMahon

(57) ABSTRACT

An improved internal combustion engine is provided with at least one channel or groove on its compression face. The at least one channel or groove can be open and of uniform width. The channel or groove can direct flow of an air-fuel mixture to increase combustion efficiency.

11 Claims, 9 Drawing Sheets

PISTONS

CROSS-REFERENCE TO RELATED APPLICATIONS

This is a continuation of U.S. patent application Ser. No. 11/463,405 filed Aug. 9, 2006 now abandoned which claims priority to U.S. Provisional Patent Application Ser. No. 60/709,942, filed Aug. 18, 2005, incorporated herein by reference, is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND

The present invention relates to improvements in combustion by enhancing burning in two and four cycle internal combustion engines.

During combustion the air-fuel mixture is drawn into the engine through the intake port due to low pressure created by the descending piston. The controlled air-fuel mixture is compressed by the rising piston to a desirable cylinder pressure. The compressed gases are ignited through a spark plug located in the cylinder head before top dead center (TDC) resulting in a sharp increase in temperature and pressure inside the combustion chamber. The expanding gases push the piston down which turns the crank rolling and storing the energy in a flywheel to do useful work.

Flame velocity and degree of combustion have a direct bearing on power output, efficiency, fuel consumption, emissions, operating temperatures, sound and vibration levels, and reliability. The flame velocity and degree of combustion are related to the state of air-fuel mixture which is ignited by the spark plug.

Four stroke combustion chamber layouts include plain cylindrical form, bath tub type, wedged shape type, and hemispherical cross flow type.

The flat portion of the cylinder head close to the piston crown at top dead center (TDC) is known as the "squish area." Generally, the trapped charge between the piston crown and the squish area nearing TDC is ejected towards the combustion chamber cavity causing turbulence prior to ignition. Higher compression ratios are possible with squish designs resulting in improved engine efficiencies. Turbulence in the charge can be also caused by inlet ports, their shapes, angles and surface finish which help to keep the air-fuel mixture in a homogeneous state at the point of entry only. Multipoint fuel injection basically atomizes fuel particles prior to entry on the intake stroke and achieves better combustion.

One purpose of squish design in internal combustion engines is to convert kinetic energy in the form of fluid flow into turbulent energy. As the piston reaches top dead center of the compression stroke, the air-fuel mixture located between the piston and the head is squished out and flows into the combustion chamber cavity. When the piston displaces the air-fuel mixture; it imparts kinetic energy into the mixture. As the squished air-fuel mixture flows into the combustion chamber cavity, the energy is converted to turbulence. The effect of the turbulence is to promote mixing of air and fuel into a more homogeneous mixture that burns more quickly and efficiently.

Two stroke engines have lesser volumetric efficiency due to obstructions in ports and short time/area available during intake and transfer phases. Due to the size, shape, and angles of the ports, the charge is in a higher state of turbulence when entering the two stroke cylinder than the four stroke cylinder. Four stroke engines require more ignition advance to operate efficiently due to the lower state of turbulence and a denser charge before combustion. The turbulence inside the cylinder and head mainly helps to maintain the air-fuel mixture in a gaseous state and prevent condensation of fuel droplets.

The squish area is normally placed in the outer circumference of the combustion chamber and are machined smooth. The squish area could be a flat or a tapered area or two separate squish areas on opposite sides. The squish areas are either flat or angled depending on the profile of the piston crown.

In principle, the piston on the upward stroke causes the compression to progressively increase. Nearing TDC, the gases around the squish area and the piston crown are pushed toward the combustion chamber cavity causing turbulence and improving flame propagation as ignition has occurred before TDC thereby greatly reducing pinging and detonation. Present day two stroke combustion chambers are hemispherical or "top hat" type with a circular or partial squish area. The spark plugs are located centrally or offset depending on the requirement.

Present day four stroke combustion chambers house the inlet and exhaust valves. Multiple valve layouts are standard in high performance designs. Partial or circular squish areas can be provided. The spark plug location depends on design and availability of space.

Cylinder heads are largely made of alloys of aluminum having steel inserts for valve seats. Basic designs typically are bath tub, wedged or double wedged with a flat roof or hemispherical cross flow type with inclined valve layouts.

Standard practice has been to have squish areas of 20% to 40% or more of the combustion chamber area which is either concentric or offset to the cylinder axis at close proximities to the piston crown, causing turbulence in two stroke engines. Depending on the number of valves and layouts, four stroke combustion chambers can be machined to provide the squish area resulting in a puff of mixture pushed towards the spark plug causing turbulence and resulting in better combustion.

Various methods for improving efficiencies of combustion in two and four stroke methods have been attempted. U.S. Pat. No. 5,065,715 which is incorporated herein by reference, discloses the use of a central bowl along with a plurality of discrete channels circumferentially spaced about the bowl where each of the channels opens into the bowl. One problem with this design is the extensive modifications to the piston. Additionally, it is believed that the bowl actually decreases efficiency.

The present invention does not contemplate heterogeneous charge compression ignition engine designs utilizing divided combustion chambers. The divided chamber engine (sometimes called a pre-combustion chamber or swirl chamber engine) has the compression volume divided in distinct chambers separated by a dividing passageway. The area between the piston and cylinder is called the main combustion chamber and the remainder of the combustion chamber area located in the cylinder head is called the antechamber, prechamber or swirl chamber. With this design, unlike a homogeneous charge engine, no fuel is pulled into the cylinder during the intake cycle, only air; fuel is directly injected into the antechamber late in the compression stroke. The function of the antechamber is to break up the liquid fuel mixing it with air from the cylinder late in the compression stroke.

There is a need for improving the efficiencies in two and four stroke homogeneous charge spark ignition internal combustion engines using modified pistons having at least one groove in the crowns.

While certain novel features of this invention shown and described below are pointed out in the annexed claims, the invention is not intended to be limited to the details specified, since a person of ordinary skill in the relevant art would understand that various omissions, modifications, substitutions and changes in the forms and details of the device illustrated and in its operation may be made without departing in anyway from the spirit of the present invention. No feature of the invention is critical or essential unless it is expressly stated as being "critical" or "essential."

BRIEF SUMMARY

The apparatus of the present invention solves the problems confronted in the art in a simple and straightforward manner. What is provided is a method and apparatus for improving the efficiency of an engine.

Combustion efficiency of an engine is related to the level of turbulence in the combustion chamber during combustion. Current squish designs are inadequate in converting kinetic energy into turbulence. With current designs, as the squish flow enters the combustion chamber cavity, it meets the forces of combustion causing transition to turbulence very quickly. The effect is a low turbulence transition rate and building of combustion end gas pressure and temperature in the squish area.

It is believed that traditional squish flow travels a short distance into the combustion chamber cavity. Once the squish flow enters the open area of the combustion chamber cavity, it is met with violent forces of combustion causing the flow to lose velocity and instantly become turbulent limiting travel distance. Traditional squish flow designs are believed to mask combustion and create crevice areas of high pressures and temperatures.

In one embodiment is provided an improved piston design, which increases an engine's ability to convert the kinetic energy created with piston movement into turbulent energy, and providing a means of directing the turbulence into specific areas of the engine's combustion chamber where it can provide the most benefit, and balancing cylinder pressures and temperatures during combustion. With the improved piston design of this embodiment, as the piston approaches top dead center, a portion of the squish air-fuel mixture is directed by grooves in the piston crown in the form of fluid flow. This fluid flow is channeled across the piston crown in the form of high velocity laminar flow. As the fluid exits the grooves in the lower pressure area of the combustion chamber cavity, flow transition is made from laminar to turbulent. The effect is delayed transition to turbulent and greater turbulence transition rate along with more of the kinetic energy being converted into turbulence at the base of the combustion chamber cavity where it can provide the most benefit.

Combustion of air-fuel mixture generates very high pressures and temperatures. In one embodiment high velocity fluid flow in the crown of an improved piston design effectively balances cylinder pressures and temperature. As pressure builds ahead of the advancing flame front, the pressure build up bleeds into the grooves in the piston crown eliminating high pressure areas and hot spots in the chamber. In addition, channeling the squish flow across the piston crown increases squish flow velocity, resulting in improved heat transfer between the combustion end gas and piston crown, further reducing detonation tendencies.

One advantage of altering fluid flow with a grooved piston design is the piston compression face has a very large surface area, near 100% of the size of the bore with very few obstructions. This large surface area allows many variations of groove layouts, numbers and lengths. This provides a method of regulating the conversion of turbulence to the needs of the specific engine.

In one embodiment grooved piston designs relieve pressure and temperature build ups and balance combustion pressures and temperatures across the piston's compression surface.

In one embodiment, a means of facilitating smooth laminar flow across the piston's compression surface with little or no disruption of fluid flow under the forces of combustion is provided.

In one embodiment, an altered squish flow path increasing velocity is provided across the piston's compression surface, facilitating greater distances traveled by the flow.

In one embodiment a modified piston design is provided having a compression face with a least one groove.

Various embodiments with different groove configurations are provided.

In one embodiment a method and apparatus is provided for increasing turbulence transition rate, converting more of the kinetic energy that is created with piston movement into turbulence.

In one embodiment, a method and apparatus for delaying transition of kinetic energy to turbulent energy is provided.

In one embodiment is provided a method and apparatus for directing the turbulence into specific areas of the combustion chamber where it can provide the most benefit.

In one embodiment is provided a method and apparatus for balancing cylinder pressures and temperatures during combustion, eliminating high pressure areas and hot spots in the chamber.

In one embodiment is provided a method and apparatus for increasing squish flow velocity.

In one embodiment is provided a method and apparatus for improving heat transfer between the combustion end gas and the piston crown.

In one embodiment is provided a method and apparatus for reducing detonation tendencies.

In one embodiment is provided a method and apparatus for regulating the conversion of turbulence to the needs of the specific engine.

The drawings constitute a part of this specification and include exemplary embodiments to the invention, which may be embodied in various forms.

BRIEF DESCRIPTION OF THE SEVERAL VIEWS OF THE DRAWINGS

For a further understanding of the nature, objects, and advantages of the present invention, reference should be made to the following detailed description, read in conjunction with the following drawings, wherein like reference numerals denote like elements and wherein.

DETAILED DESCRIPTION

Detailed descriptions of one or more preferred embodiments are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in any appropriate system, structure or manner.

These detailed descriptions of the pistons provided herein are elements of a homogeneous charge spark ignition internal combustion engine. The homogenous air-fuel mixture is achieved by injection of fuel into the inlet air stream or by carburetion. The engine is fitted with pistons moving up and down in cylinders for the purpose of turning a crankshaft. A bottom opened combustion chamber cavity is formed in a cylinder head that is fixed to the top of the each cylinder. As the piston approaches top dead center, the compression face of the piston combines with the compression face of the cylinder head defining a single combustion space for each cylinder; the compression face of the piston forms the base of the combustion chamber. Flat portions of the cylinder heads compression face at the parameter of the combustion chamber cavity come in close proximity with flat surface portions of the compression face of the piston to define squish area(s). These squish areas are designed to displace the air-fuel mixture between the flat surfaces as the piston reaches top dead center. The present invention provides a means of channeling this air-fuel mixture from the squish area across the compression face of the piston top to a pre-determined location at the base of the bottom opened combustion chamber cavity to promote mixing of the air and fuel into a more homogeneous mixture that burns more quickly and efficiently.

Figure 1:
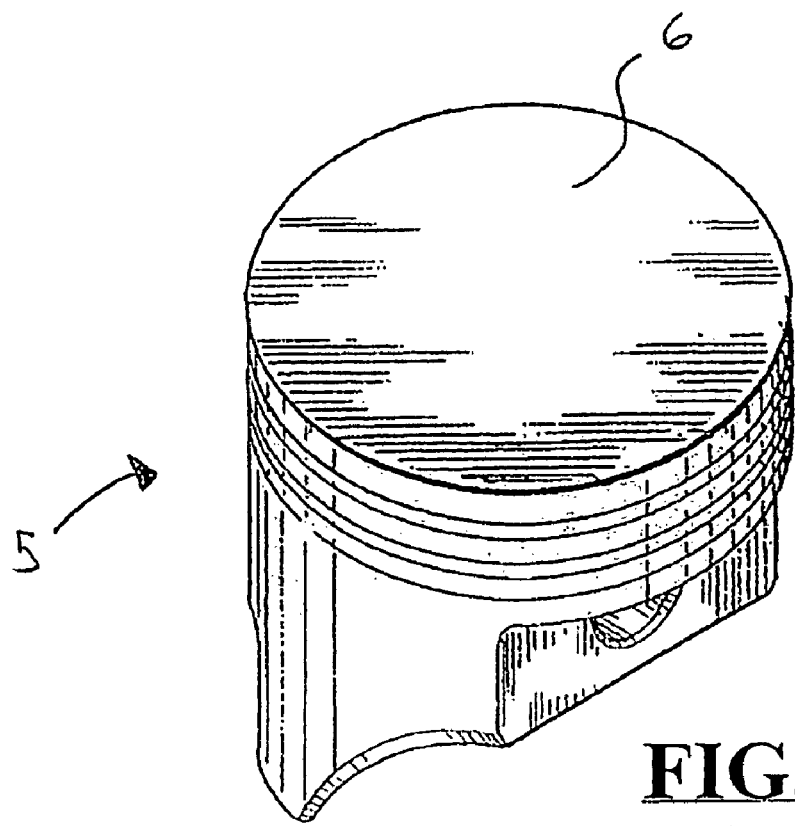
FIG. 1 is a perspective view of a prior art piston with flat compression face.
Figure 2:
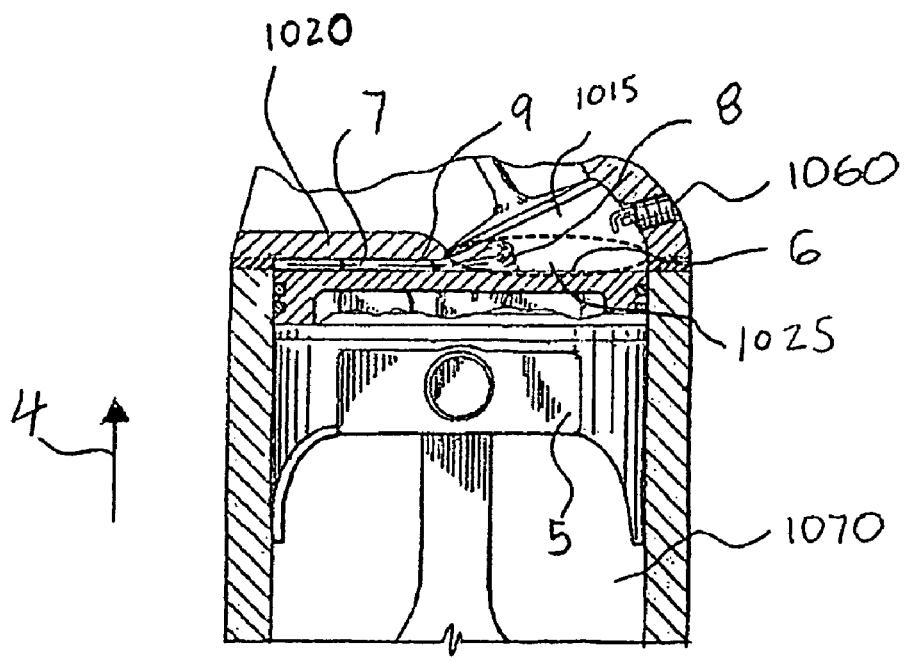
FIG. 2 is a schematic design illustrating movement of an air-fuel mixture from the squish area with a prior art piston.

FIG. 1 is a perspective view of a prior art piston 5 with flat compression face 6. FIG. 2 is a schematic diagram illustrating displacement of an air-fuel mixture 8 from the squish area 7 with prior art piston 5. Compression face 6 located on the crown of piston 5 forms the base of the bottom opened combustion chamber cavity 1025 to define a single combustion space 1015. Piston 5 includes no grooves to direct flow of an air-fuel mixture 8 in the direction of arrows 9 as piston 5 moves in the direction of arrow 4 with an inefficient development/creation/directing of turbulence in the air-fuel mixture for combustion.

Figure 3:
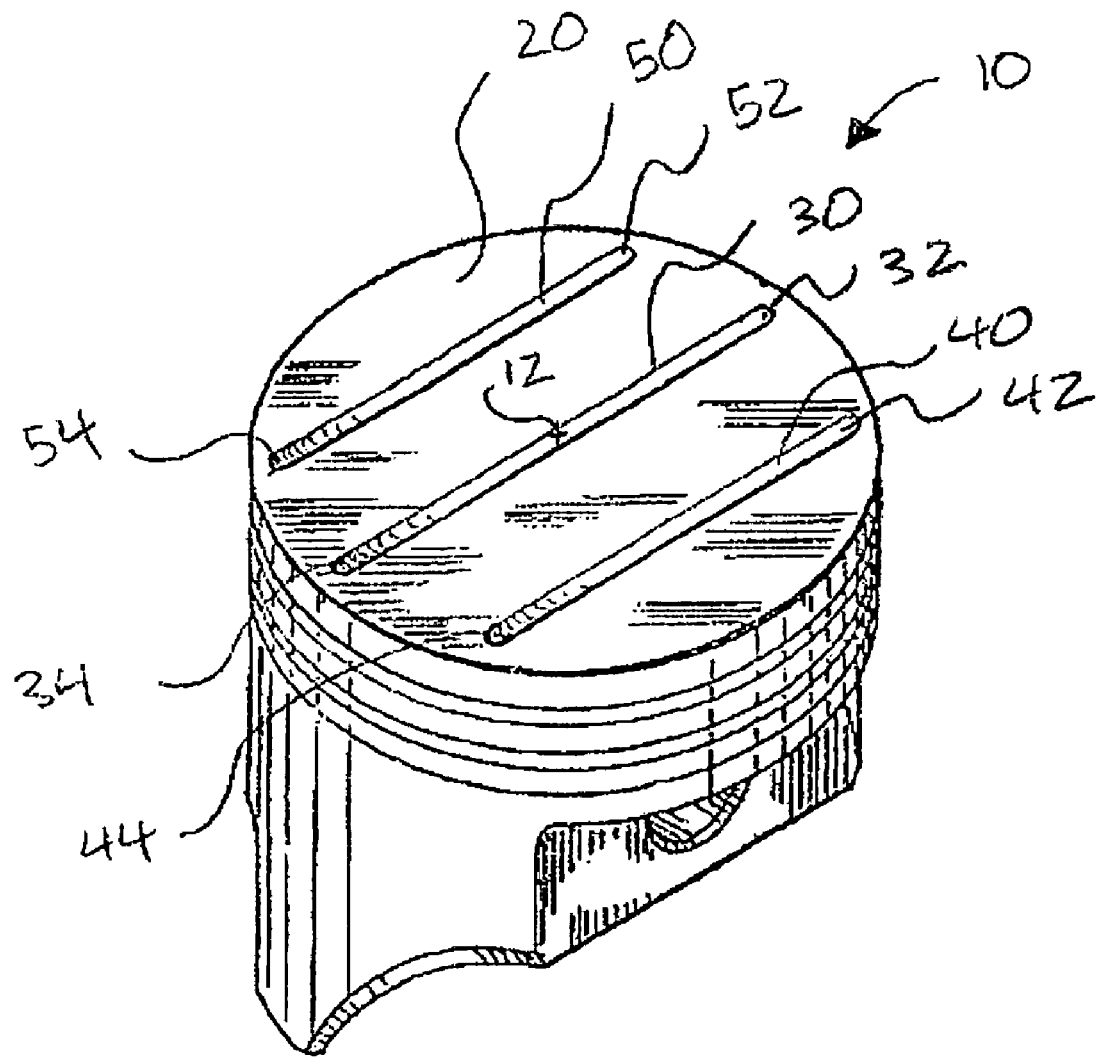
FIG. 3 shows a piston with a three groove lay out.

FIG. 3 shows a piston 10 with a three groove lay out. Piston 10 has compression face 20 and grooves 30, 40, 50. Grooves 30, 40, 50 can have planar edges, squared, or be rounded. Grooves 30, 40, 50 can be molded or can be machined. Grooves 30, 40, 50 increase the development/creation/directing of turbulence in the air-fuel mixture for combustion. Groove 30 has first end 32 and second end 34 and passes through geometric center 12 of piston 10. Groove 40 has first end 42 and second end 44. groove 50 has first end 52 and second end 54. Grooves 30, 40, and/or 50 can better direct flow of an air-fuel mixture across the compression face 20 of piston 10. Groove 30 is shown passing through geometric center 12 of piston 10, however, this need not be the case. Grooves 40 and 50 are shown generally symmetrically located above groove 30, however this need not be the case. Grooves 30, 40, 50 are shown as being parallel, however, in alternative embodiments these grooves can be non-parallel. Also alternatively, one or more of these grooves can intersect one or more of the other grooves.

Figure 4:
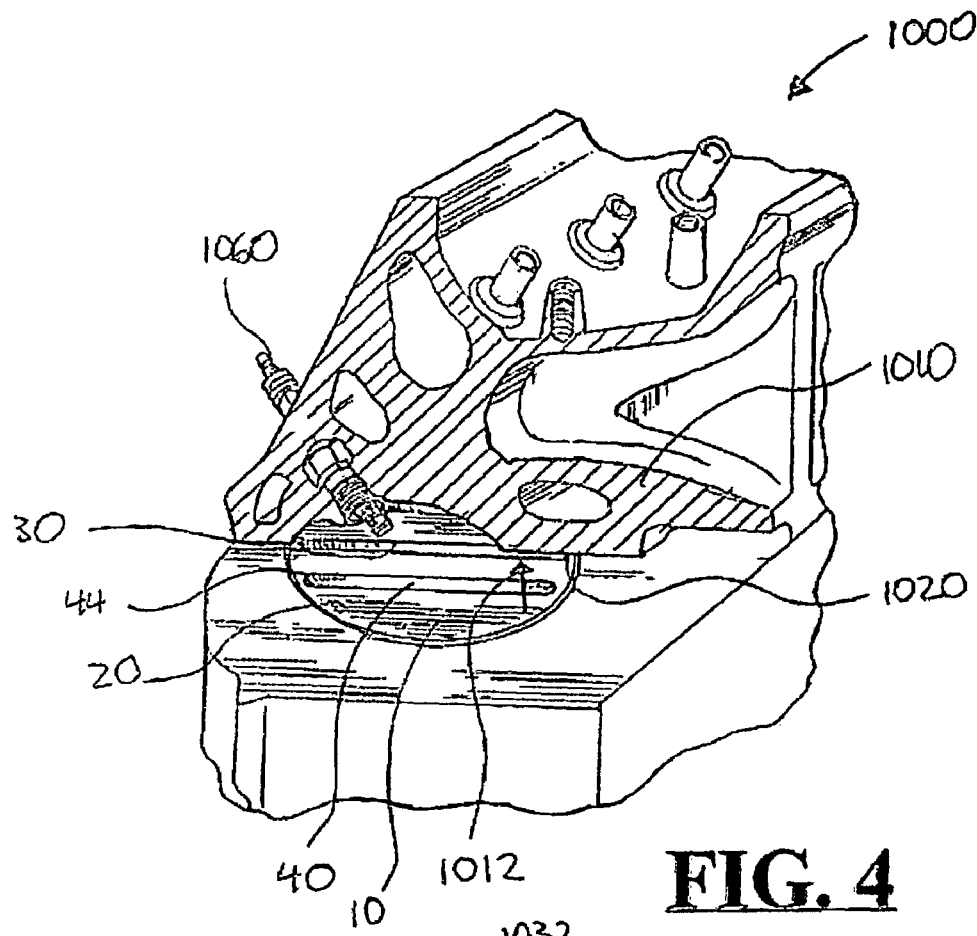
FIG. 4 is a cutaway perspective view showing the piston of FIG. 3 in an engine.
Figure 5:
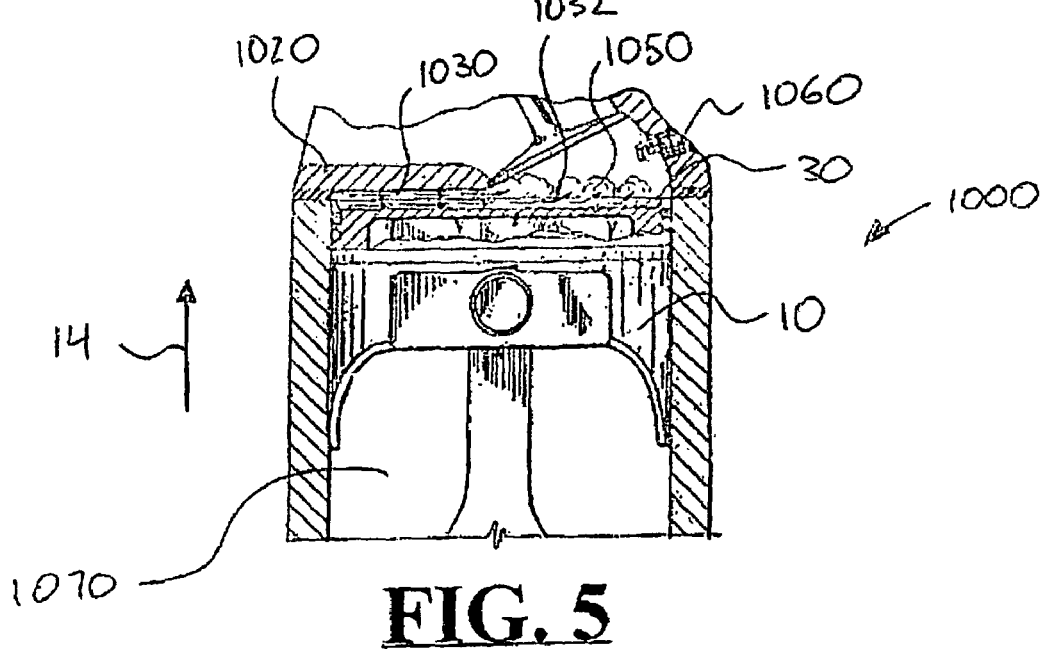
FIG. 5 illustrates movement of a mixture from the squish area into the combustion chamber cavity using the piston of FIG. 3.

FIGS. 4 and 5 schematically illustrate movement of an air-fuel mixture 1050 through the squish area 1030 of an engine 1000. Engine 1000 can comprise one or more cylinders 1070 and pistons 10. One or more heads 1010 can also be included. For simplicity only one cylinder 1070 and one piston 10 is shown. In this diagram piston 10 is shown at top dead center (after having moved in the direction of arrow 14). Squish area 1030 is generally the space between the compression face 20 of piston 10 and lower portion 1020 of head 1010. Compression face 20 can be the piston crown of piston 10, as piston 10 moves in the direction of arrow 14 an air-fuel mixture 1032 is compressed in squish area 1030, causing air-fuel mixture 1050 to move in the direction of arrows 1032. Special grooves, 30, 40, 50 on compression face 20 of piston 1010 can facilitate directing air-fuel mixture 1050.

Figure 6:
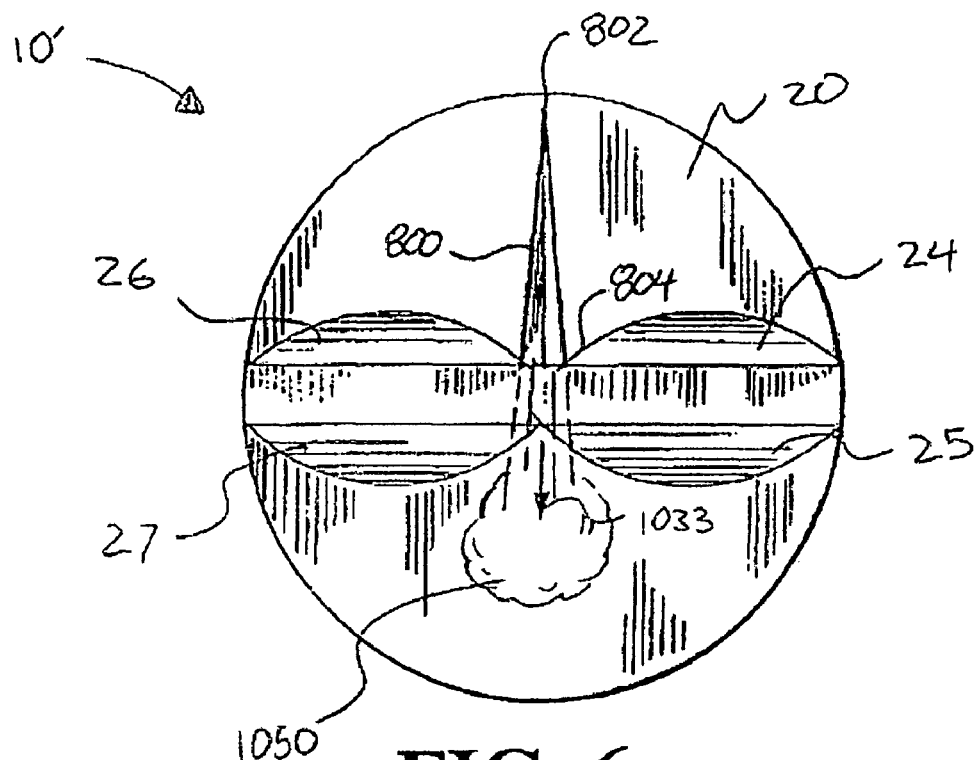
FIG. 6 is a top view of the compression face of an alternative piston indicating movement of an air-fuel mixture from the squish area.

FIG. 6 is a top view of piston 10' showing an alternative embodiment of a grooved piston. Piston 10' can have a single groove 800 on compression face 20. Groove 800 can have distal 802 and proximate 804 ends. Groove 800 can widen from distal 802 to proximate end 804. Compression face 20 can also include valve relief areas 24, 25, 26, 27. Groove 800 can have planar edges, squared, or be rounded. Groove 800 can be molded or can be machined. Schematically illustrated in FIG. 6 is the movement of air-fuel mixture 1050 from squish area in the direction of arrow 1033.

Figure 7:
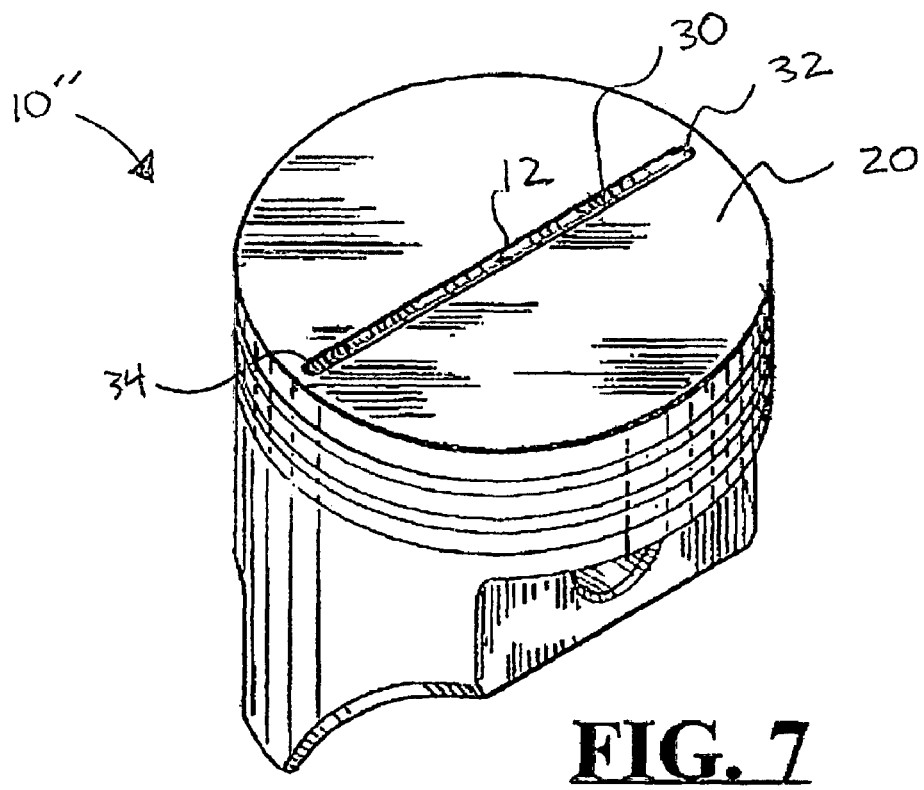
FIG. 7 is a perspective view of another alternative piston having a single groove.

FIG. 7 is a perspective view of a piston 10" showing an alternative embodiment of a grooved piston. Piston 10" can include compression face 20. On compression face 20 can be groove 30, which can have a uniform width and extend through geometric center 12 of compression face 20. First end 32 can be located adjacent the perimeter of compression face 20. Second end 34 can be located adjacent the perimeter of compression face 20, but opposite first end 32. Alternatively, groove 30 can end at geometric center 12, groove 30 can be of uniform depth. Alternatively, it can have a non-uniform depth--such as increasing in depth towards geometric center 12 from first end 40 to geometric center 12 along with increasing in depth from second end 34 to geometric center 12. Alternatively, it can decrease in depth toward geometric center 12, groove 30 can be of uniform width. Alternatively, it can have a non-uniform width Such as decreasing width toward geometric center 12 from first end 40 to geometric center 12 along with decreasing width from second end 34 to geometric center 12. Alternatively, it can increase in width toward geometric center 12.

In alternative embodiments, grooves can have irregular shapes, such as branching, curves, or other shapes differing from straight lines.

Figures 8, 9, 10:
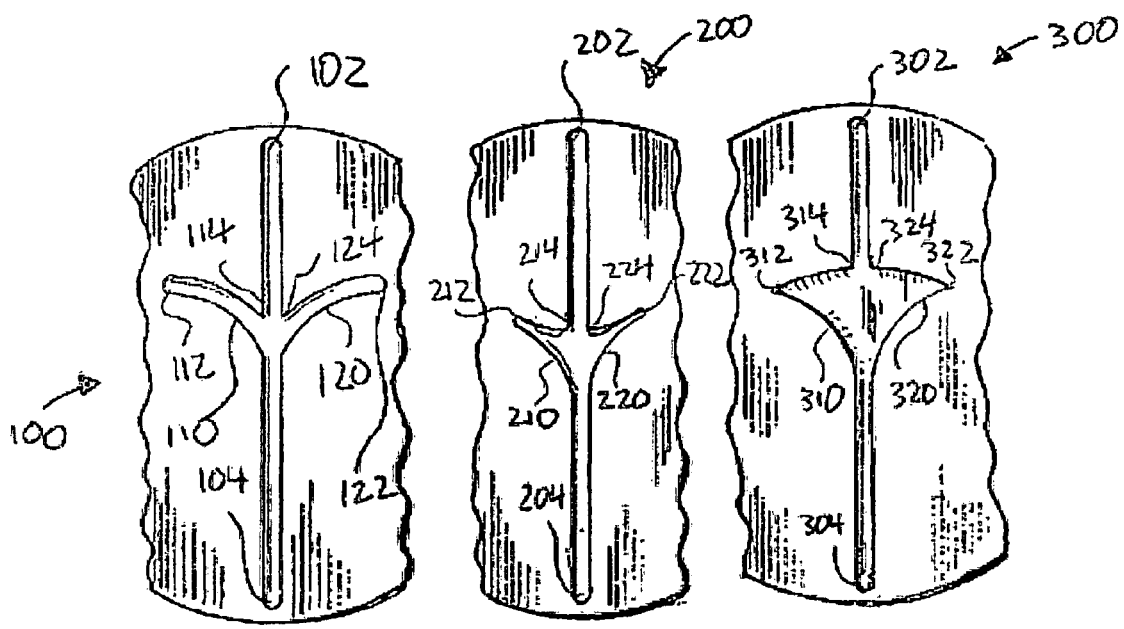
FIG. 8 shows a groove with branches.
FIG. 9 shows a groove with alternative branches.
FIG. 10 shows a groove with alternative branches.

FIG. 8 shows an alternative groove 100 with branches 110, 120. Groove 100 can include first end 102 and second end 104. Branches 110, 120 can be curved and of generally uniform width. Branches 110, 120 can curve toward second end 104. Branches 110, 120 can be located generally opposite of one another in relation to groove 100. Alternatively, branches 110, 120 can widen from first ends 112, 122 to second ends 114, 124. Additional pairs of branches can be added along the length of groove 100.

FIG. 9 shows an alternative groove 200 with branches 210, 220. Groove 200 can include first end 202 and second end 204. Branches 210, 220 can be curved and can widen from first end 212, 222 to second ends 214, 224. The sides of branches 210, 220 closest to second end 204 can curve toward second end 204. The sides of branches 210, 220 closest to first end 202 can curve toward first end 202. Branches 210, 220 can be located generally opposite of one another in relation to groove 200. Additional pairs of branches can be added along the length of groove 200.

FIG. 10 shows an alternative groove 300 with branches 310, 320. Groove 300 can include first end 302 and second end 304. Branches 310, 320 can be curved and can widen from first ends 312, 322 to second ends 314, 324. Branches 310, 320 can curve toward second end 304. Branches 310, 320 can be located generally opposite of one another in relation to groove 300. Additional pairs of branches can be added along the length of groove 300.

In one embodiment the grooves and/or branches of FIG. 8-10 can be combined and/or mixed with each other.

Figure 11:
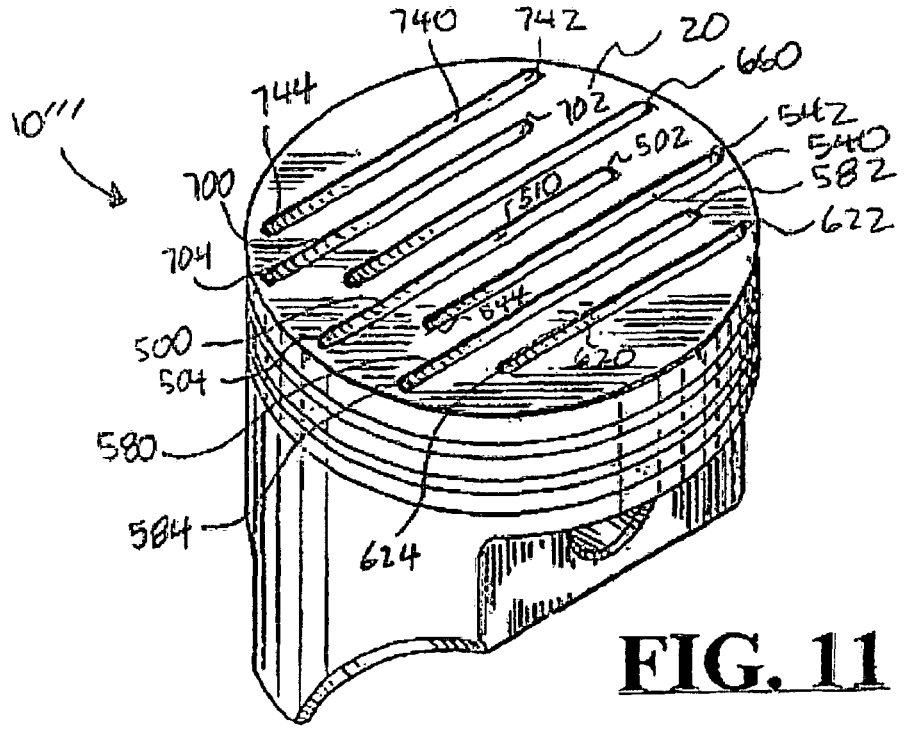
FIG. 11 shows multiple grooves on the compression face of a piston.

FIG. 11 shows piston 10''' having multiple grooves 500, 540, 580, 620, 660, 700, 740 on its compression face 20. Groove 500 can pass through geometric center 510 of piston 10''' and have first end 502 and second end 504. Groove 540 can have first end 542 and second end 544. Groove 580 can have first end 582 and second end 584. Groove 620 can have first end 622 and second end 624. Groove 660 can have first 662 and second end 664. Groove 700 can have first end 702 and second end 704. Groove 740 can have first end 742 and second end 744. In this embodiment the grooves are parallel, but offset with respect to each other, at least with respect to the next adjacent groove. Each groove can include first and second ends.

Figure 12:
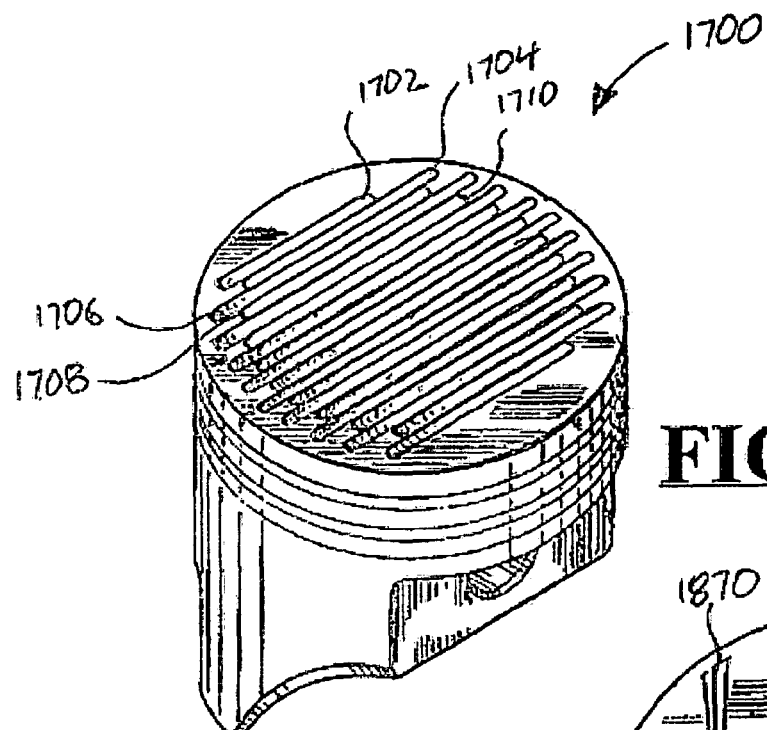
FIG. 12 shows a piston with multiple grooves places offset and immediately adjacent each other.

FIG. 12 shows a piston 1700 with multiple grooves 1702, 1704, 1706, etc., placed offset and immediately adjacent each other. In this embodiment the grooves are parallel, but offset with respect to each other, at least with respect to the next adjacent groove. Each groove can include first and second ends.

Figure 13:
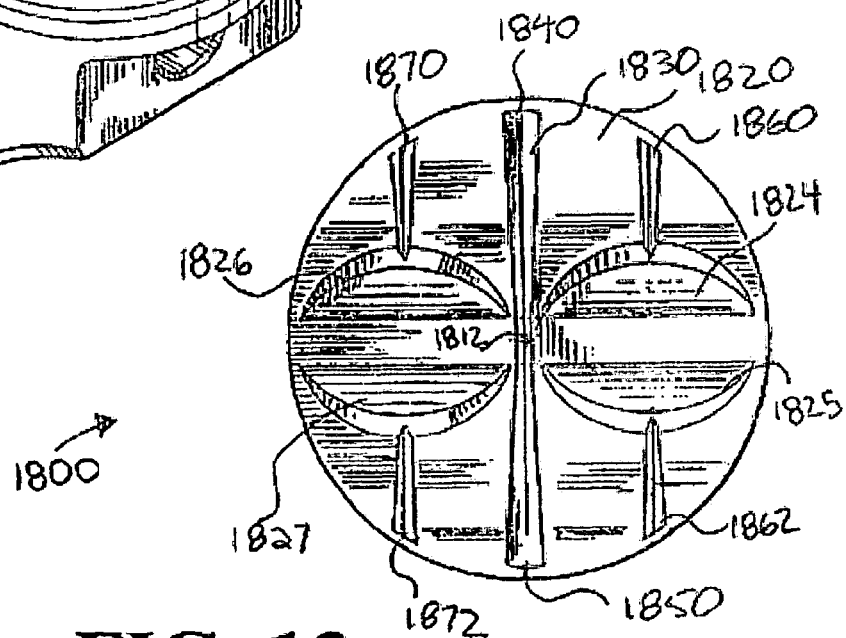
FIG. 13 shows a piston with valve relief areas and multiple grooves that widen and become more shallow as they extend toward the piston's outer perimeter.

FIG. 13 shows a piston 1800 with a single center groove 1830 and grooves 1860, 1862 and 1870, 1872 entering the valve relief areas 1824, 1825, 1826, 1827. Center groove 1830 can pass through geometric center 1860 of piston 1800. Any of the grooves can be of uniform depth. Alternatively, the depth can vary from distal to center, and from center to opposite distal ends.

Figure 14:
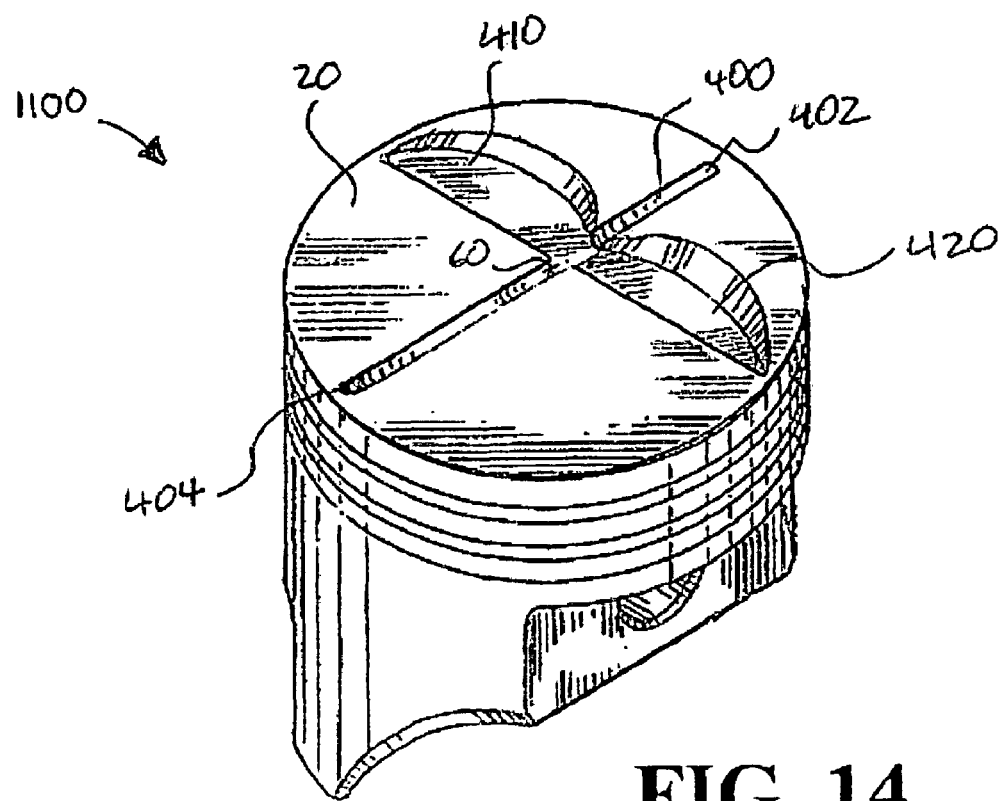
FIG. 14 is a perspective view of a piston having valve relief areas and a groove.

FIG. 14 is a perspective view of a piston 1100 having valve relief areas 410, 420 and groove 400. Groove 400, which can have a uniform width and extend through geometric center 60 of compression face 20. First end 402 can be located adjacent the perimeter of compression face 20. Second end 404 can be located adjacent the perimeter of compression face 20. Groove 400 can be of uniform depth. Alternatively, it can have a non-uniform depth—such as an increasing depth toward geometric center 60 from first end 404 to geometric center 60 along with an increasing depth from second end 404 to geometric center 60. Alternatively, it can decrease in depth toward geometric center 60.

Figure 15:
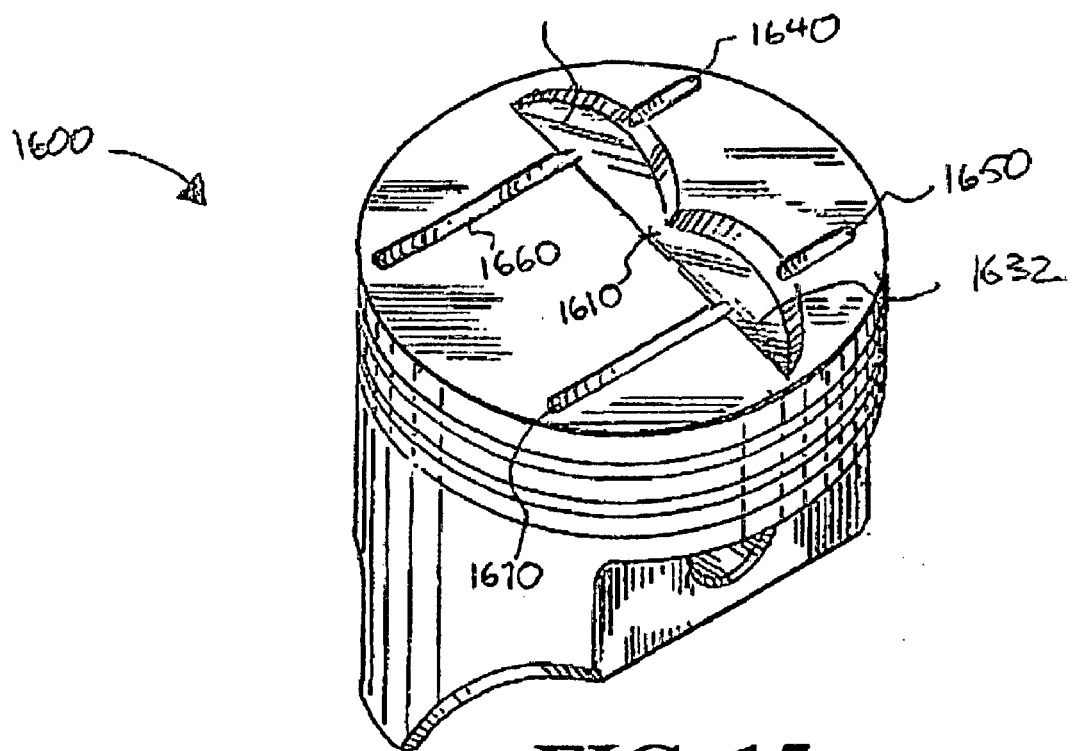
FIG. 15 is a perspective view of a piston having two valve relief areas and multiple grooves.

FIG. 15 shows a piston 1600 with two valve relief areas 1630, 1632 and multiple grooves 1640, 1650, 1660, 1670. The lower grooves 1640, 1650 are fed from the squish area on the spark plug side of the head and the upper grooves 1660, 1670 are fed from the opposite squish area. This design also utilizes a groove layout that does not pass through the geometric center 1610 of the compression face. Grooves 1640, 1650 can be parallel and line up with grooves 1660, 1670.

Figure 16:
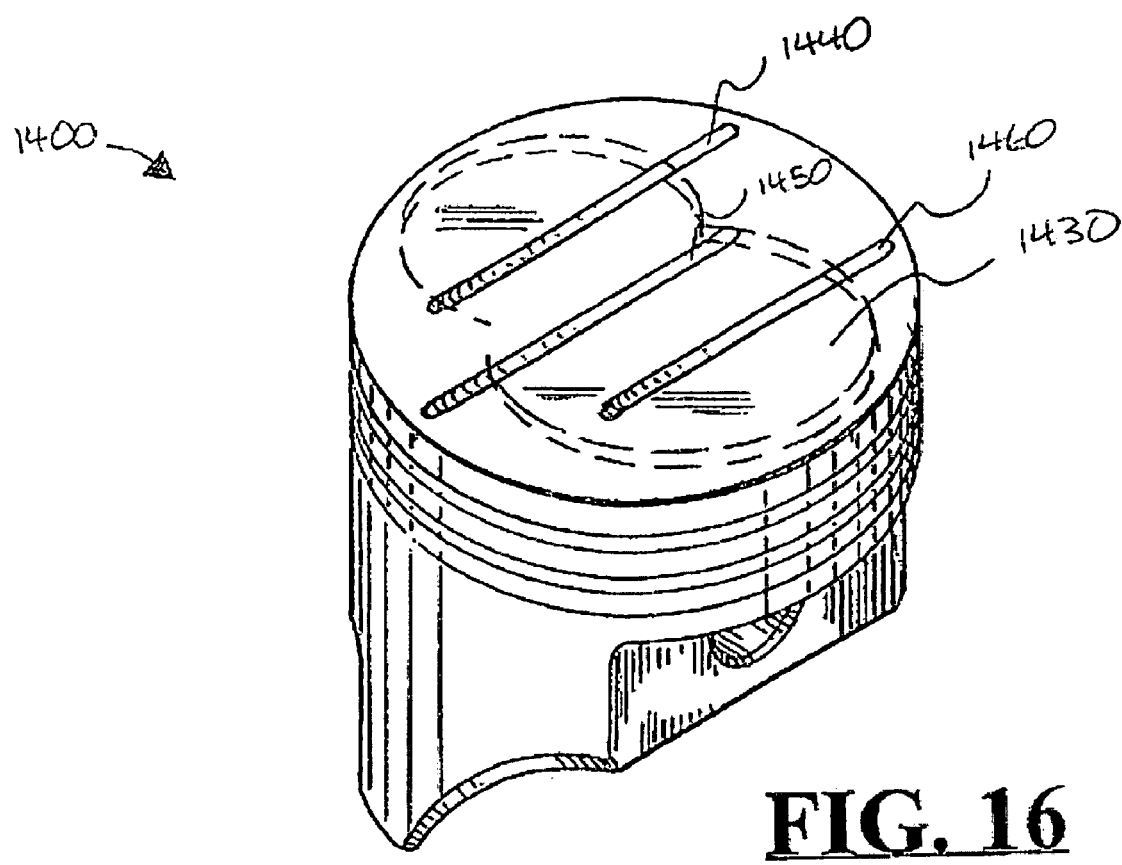
FIG. 16 is a perspective view of a piston having multiple grooves which are offset from each other along with a cylinder head superimposed.

FIG. 16 shows a piston 1400 having multiple grooves 1440, 1450, 1460 which are offset from each other along with a superimposed cylinder head 1430. When the grooves are offset with respect to each other and a cylinder head 1430 with two squish areas on opposite sides is overlaid using this embodiment, the squish flow in adjacent groove flow in the opposite directions.

Figure 17:
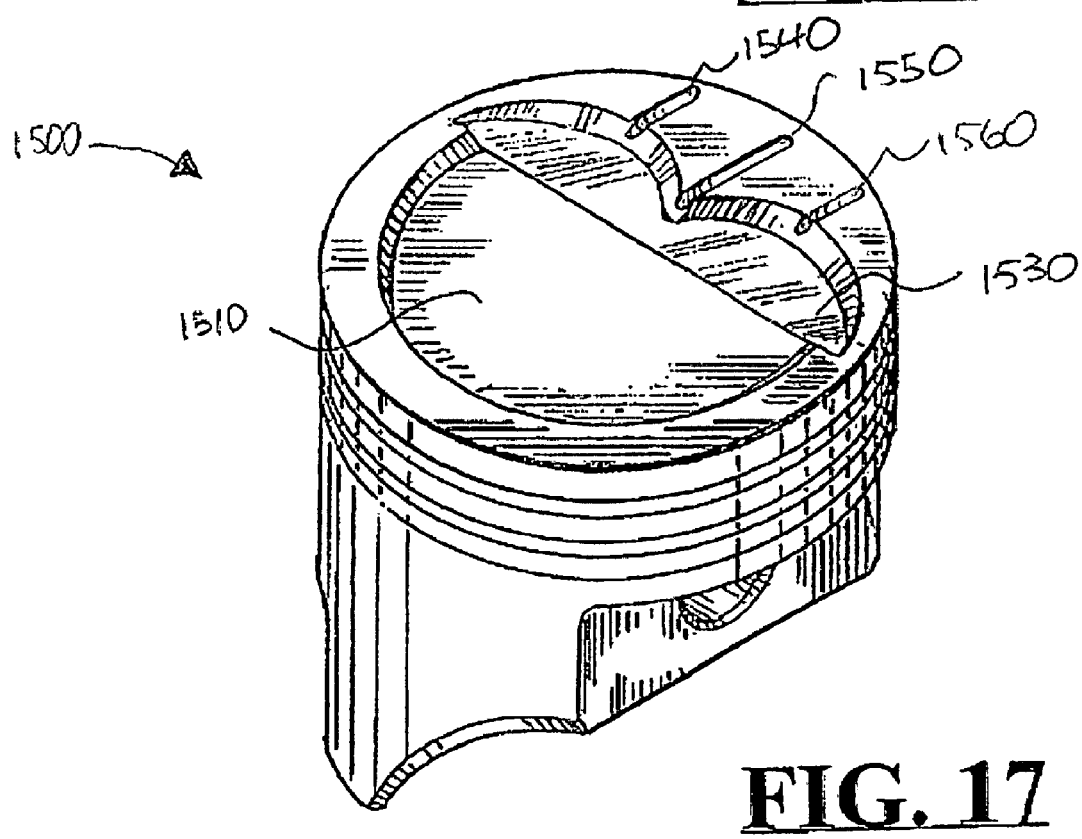
FIG. 17 is a perspective view of a piston showing a groove layout in a flat piston surface area opposite of the spark plug where the piston includes a dished or recessed area under the combustion chamber cavity.

FIG. 17 shows a piston 1500 having groove lay out 1540, 1550, 1560 in a flat piston surface area opposite of the spark plug where piston 1500 includes a dished or recessed area 1510 under the combustion chamber scoop.

Figure 18:
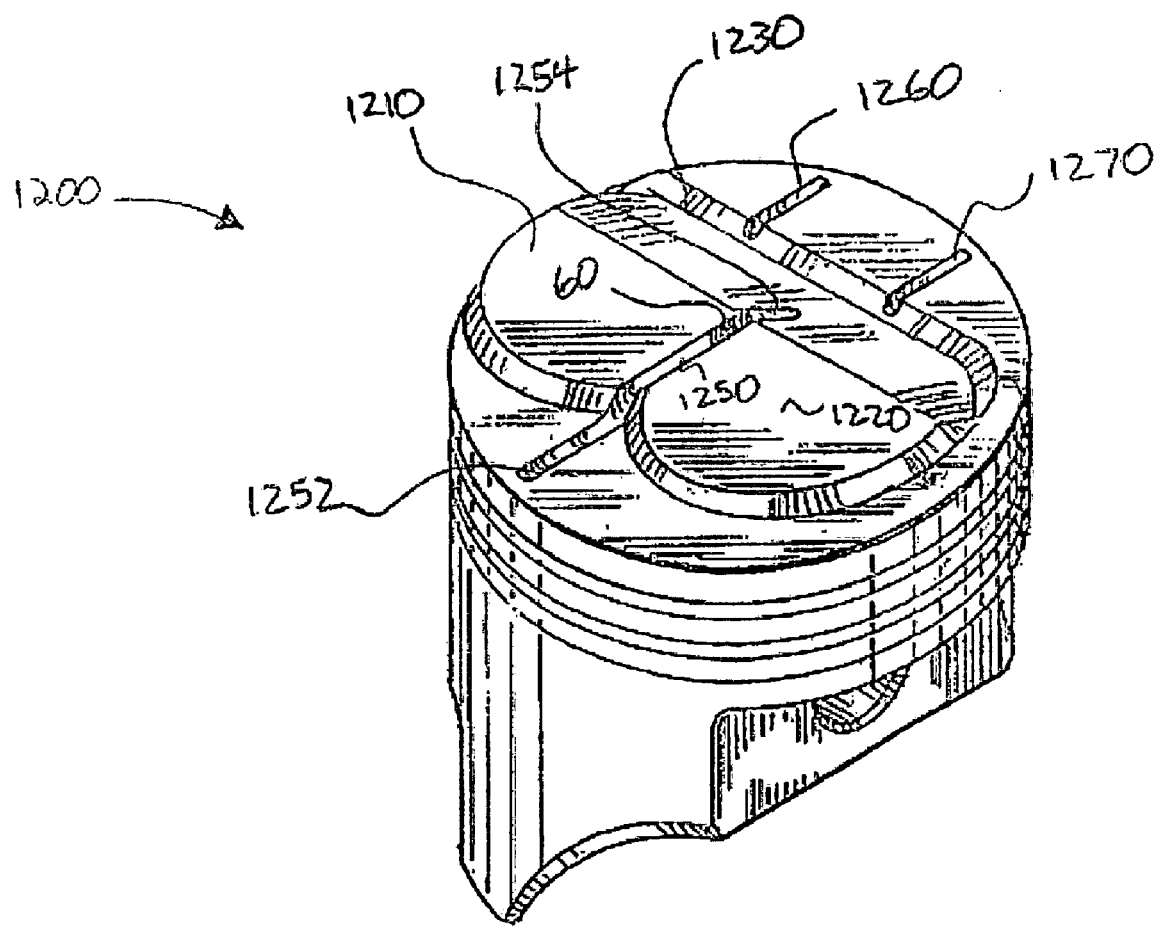
FIG. 18 is a perspective view of a piston having raised areas and multiple grooves.

FIG. 18 is a perspective view of a piston 1200 having raised areas 1210, 1220 and groove 1250. Valve relief area 1230 can also be provided adjacent raised areas 1210, 1220. Groove 1250 can have a uniform width and extend through geometric center 60 of compression face 1220. First end 1252 can be located adjacent the perimeter of compression face 1220. Second end 1254 can be located on the opposite side of raised areas 1210, 1220. Groove 1250 can be of uniform depth. Alternatively, it can have a non-uniform depth—such as an increasing depth toward geometric center 60 from first end 1252 to second end 1254. Alternatively, the depth can be set so that it remains constant even when passing through raised areas 1210, 1220. Secondary grooves 1260, 1270 can also be used. These can be spaced apart in related to groove 1250 and can be parallel to groove 1250.

It is believed that placement of grooves in pistons is an improvement compared to grooves in cylinder heads. When the grooves are placed in the cylinder head, the length and location of the grooves are restricted by the combustion chamber scoop area and the valves, the scoop areas consumes 65%-85% of the cylinder head deck surface. This design is limited to directing the "puff" of the air-fuel mixture 1050 to the parameter of the combustion chamber cavity. When the grooves are placed in the piston face the "puff" of the air-fuel mixture 1050 can be directed across the entire face of the piston. One limitation where one or more grooves are placed on the piston face is when the engine design requires valve relief notches in the piston top.

In one embodiment improved piston design permits 10% or more increase in compression ratio compared to present engine designs with out detonation tendencies when burning intended fuel.

The maximum cylinder pressure that can be developed without producing detonation determines efficiency and power production limits in an spark ignition internal combustion engine. Nearly all internal combustion piston engines are limited in their efficiency and power output by the octane and detonation sensitivity of the fuel they use.

Current practice of OEM manufacturers is to produce engines with 9:1-11:1 compression ratios depending on combustion chamber design, the grade of fuel to be used and intended application. During design, the specific engine compression ratio is adjusted to maximum efficiency/power on the intended fuel. Engines burning 87 octane regular fuel are detonation limited to 10:1 compression. With superior 91 octane premium fuel, ratios up to 11:1 can be used to deliver additional efficiency and power.

Utilizing the improved piston design engines are able to run compression ratios that are 10% or more higher than current practice. Burning 91 octane premium fuel, engines are able to operate with compression ratios of 11.5:1 or higher. The design of the improved piston provides balanced cylinder pressures and temperatures during combustion; as a result high pressure areas and hot spots in the chamber are eliminated. This combined with increased squish flow velocity that improves heat transfer between the combustion end gas and the piston crown reduces detonation tendencies allowing the higher compression with the available fuels.

In one embodiment a method of increasing the squish flow outlet area by 100% or more is provided. Current squish designs are limited to delivering squish action at the perimeter of the combustion chamber cavity. The effect is a low turbulence transition rate and building of combustion end gas pressure and temperature in the squish area. The resulting low kinetic energy transition to turbulence has proven to be inadequate for low RPM performance and economy.

Channeling the squish flow across the piston top with the improved piston design increases the squish flow outlet area by 100% or more. As the piston approaches top dead center, a portion of the squish air-fuel mixture is directed into grooves in the piston crown in the form of fluid flow. This fluid flow is channeled across the piston crown in the form of high velocity laminar flow. As the fluid exits the grooves in the lower pressure area of the combustion chamber cavity, flow transition is made from laminar to turbulent. The effect is delayed transition to turbulent and greater turbulence transition rate; more of the kinetic energy is converted into turbulence at the base of the combustion chamber cavity where it can provide the most benefit.

In one embodiment is provided a piston design that permits 10% or more increase in squish area with out increasing detonation tendencies burning intended fuel.

Modern practice is to design engines with squish area to bore ratios of 12% to 40%. Engines utilizing larger squish areas have a tendency of developing isolated regions of high pressure and temperatures in the unburned air-fuel mixture during the combustion process that can lead to end gas detonation.

The improved piston design provides a method of balancing cylinder pressures and temperatures during combustion, eliminating high pressure areas and hot spots in the chamber. As a result squish areas 10% larger or more compared to current practice is possible. As pressure builds ahead of the advancing flame front, the pressure build up bleeds into the grooves in the piston crown eliminating high pressure area and hot spots in the chamber.

The following is a list of reference numerals:

| LIST FOR REFERENCE NUMERALS | |
|---|---|
| (Reference No.) | (Description) |
| 4 | arrow |
| 5 | prior art piston |
| 6 | compression face |
| 7 | squish area |
| 8 | mixture of air-fuel |
| 9 | arrows |
| 10 | piston |
| 12 | geometric center |
| 14 | arrow |
| 20 | compression face |
| 22 | squish area |
| 24 | valve relief area |
| 25 | valve relief area |
| 26 | valve relief area |
| 27 | valve relief area |

-continued

| LIST FOR REFERENCE NUMERALS | |
|---|---|
| (Reference No.) | (Description) |
| 30 | straight groove |
| 32 | first end |
| 34 | second end |
| 40 | straight groove |
| 42 | first end |
| 44 | second end |
| 50 | straight groove |
| 50 | first end |
| 54 | second end |
| 60 | geometric center |
| 100 | groove with branches of uniform width |
| 102 | first end |
| 104 | second end |
| 110 | first branch |
| 112 | first end of first branch |
| 114 | second end of first branch |
| 120 | second branch |
| 122 | first end of second branch |
| 124 | second end of second branch |
| 200 | groove with branches of non-uniform width |
| 202 | first end |
| 204 | second end |
| 210 | first branch |
| 212 | first end of first branch |
| 214 | second end of first branch |
| 220 | second branch |
| 222 | first end of second branch |
| 224 | second end of second branch |
| 300 | groove with branches of non-uniform width |
| 302 | first end |
| 304 | second end |
| 310 | first branch |
| 312 | first end of first branch |
| 314 | second end of first branch |
| 320 | second branch |
| 322 | first end of second branch |
| 324 | second end of second branch |
| 400 | groove |
| 402 | first end |
| 404 | second end |
| 410 | valve relief area |
| 420 | valve relief area |
| 500 | groove |
| 502 | first end |
| 504 | second end |
| 510 | geometric center |
| 540 | groove |
| 542 | first end |
| 544 | second end |
| 580 | groove |
| 582 | first end |
| 584 | second end |
| 620 | groove |
| 622 | first end |
| 624 | second end |
| 660 | groove |
| 662 | first end |
| 664 | second end |
| 700 | groove |
| 702 | first end |
| 704 | second end |
| 740 | groove |
| 742 | first end |
| 744 | second end |
| 800 | widening groove |
| 802 | first end |
| 804 | second end |
| 1000 | engine |
| 1010 | head |
| 1012 | squish area |
| 1015 | single combustion space |
| 1020 | lower portion of head |
| 1025 | base of bottom opened combustion chamber cavity |
| 1030 | squish area |
| 1032 | arrows |

-continued

LIST FOR REFERENCE NUMERALS

| (Reference No.) | (Description) |
|---|---|
| 1033 | arrow |
| 1050 | mixture and air-fuel |
| 1060 | spark plug |
| 1070 | cylinder |
| 1200 | piston |
| 1210 | raised area |
| 1220 | raised area |
| 1230 | valve relief area |
| 1250 | groove |
| 1252 | first end |
| 1254 | second end |
| 1260 | secondary groove |
| 1270 | secondary groove |
| 1400 | piston |
| 1430 | superimposed cylinder head |
| 1440 | groove |
| 1450 | groove |
| 1460 | groove |
| 1500 | piston |
| 1510 | dished or recessed area |
| 1530 | valve relief area |
| 1540 | groove |
| 1550 | groove |
| 1560 | groove |
| 1600 | piston |
| 1610 | geometric center |
| 1630 | valve relief area |
| 1632 | valve relief area |
| 1640 | groove |
| 1650 | groove |
| 1660 | groove |
| 1670 | groove |
| 1700 | piston |
| 1702 | groove |
| 1704 | groove |
| 1706 | groove |
| 1708 | groove |
| 1710 | groove |
| 1800 | piston |
| 1812 | geometric center |
| 1820 | compression face |
| 1822 | squish area |
| 1824 | valve relief area |
| 1825 | valve relief area |
| 1826 | valve relief area |
| 1827 | valve relief area |
| 1830 | straight groove |
| 1840 | first end |
| 1850 | second end |
| 1860 | groove |
| 1862 | groove |
| 1870 | groove |
| 1872 | groove |

All measurement disclosed herein are at standard temperature and pressure, at sea level on Earth, unless indicated otherwise. All materials used or intended to be used in a human being are biocompatible, unless indicated otherwise.

It will be understood that each of the elements described above, or two or more together may also find a useful application in other types of methods differing from the type described above. Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention set forth in the appended claims. The foregoing embodiments are presented by way of example only; the scope of the present invention is to be limited only by the following claims.

The invention claimed is:

1. A homogeneous charge spark ignition internal combustion engine comprising:
   (a) at least one piston reciprocal in at least one cylinder, the cylinder having a cylinder head, the cylinder head having a bottom open combustion chamber cavity, as the piston approaches top dead center, the top surface of the piston combines with the lower portion of the cylinder head to define a single combustion space which confines the entire compressed air fuel volume, flat portions of the cylinder head at the parameter of the combustion chamber cavity come in close proximity with flat surface portions of the piston to define squish area(s);
   (b) the piston having a compression face of circular shape; and
   (c) at least three grooves of uniform width formed in the piston compression face and the at least three grooves extending nearly across the entire compression face, said at least three grooves channeling air fuel mixture from the squish area across the compression face of a piston top to pre-determined locations at the base of the combustion chamber cavity.

2. The engine of claim 1, wherein the at least one groove passes through the geometric center of the compression face.

3. The engine of claim 1, wherein the at least one groove includes at least one pair of opposed branches.

4. The engine of claim 3, wherein the pair of opposed branches are curved and generally uniform width.

5. The engine of claim 3, wherein each branch decreases in area as it extends away from the at least one groove.

6. The engine of claim 3, wherein a second pair of branches are connected to the at least one groove.

7. The engine of claim 4, wherein the each branch curves toward the geometric center of the compression face.

8. A homogeneous charge spark ignition internal combustion engine comprising:
   (a) at least one piston reciprocal in at least one cylinder, the cylinder having a cylinder head, the cylinder head having a bottom open combustion chamber cavity, as the piston approaches top dead center, the top surface of the piston combines with the lower portion of the cylinder head to define a single combustion space which confines the entire compressed air fuel volume, flat portions of the cylinder head at the parameter of the combustion chamber cavity come in close proximity with flat surface portions of the piston to define squish area(s);
   (b) the piston having a compression face of circular shape; and
   (c) at least three grooves formed in the piston compression face arranged in a parallel configuration and the at least three grooves extending nearly across the entire compression face, said at least three grooves channeling air fuel mixture from the squish area across the compression face of a piston top to pre-determined locations at the base of the combustion chamber cavity.

9. The engine of claim 8, wherein the first and second ends of each groove are offset at least with respect to the next groove.

10. The engine of claim 8, wherein said grooves are formed in a spaced-apart relationship to each other, and wherein said first and second ends of adjacent grooves are arranged in a staggered pattern.

11. The engine of claim 8, wherein said grooves are formed in immediate proximity to each other.

* * * * *